Dec. 22, 1953  C. W. HELM, JR  2,663,050
RECORD APPARATUS AND METHOD

Filed July 30, 1951  3 Sheets-Sheet 1

INVENTOR
CHARLES W. HELM, JR.
BY Raymond Wheotton
ATTORNEY

Dec. 22, 1953  C. W. HELM, JR  2,663,050
RECORD APPARATUS AND METHOD
Filed July 30, 1951  3 Sheets-Sheet 2

INVENTOR
CHARLES W. HELM, JR.
BY Raymond W Bolton
ATTORNEY

Dec. 22, 1953    C. W. HELM, JR    2,663,050
RECORD APPARATUS AND METHOD

Filed July 30, 1951    3 Sheets-Sheet 3

INVENTOR
CHARLES W. HELM, JR,
BY
ATTORNEY

Patented Dec. 22, 1953

2,663,050

UNITED STATES PATENT OFFICE 2,663,050

RECORD APPARATUS AND METHOD

Charles W. Helm, Jr., Rocky Hill, Conn., assignor to The Gray Manufacturing Company, a corporation of Connecticut Application July 30, 1951, Serial No. 239,341

13 Claims. (Cl. 18—1)

In the restoration of the surfaces of embossed thin flexible thermoplastic sound records it has been found that some provision must be made to maintain the thermoplastic material in extended relationship during the heating operation to prevent buckling and distortion. The only commercially feasible method and apparatus proposed thus far for this purpose has utilized a heated roll in contact with the surface of the record to be restored for a limited time sufficient to plasticize the record at least to its embossed depth but insufficient to plasticize the record through its entire thickness. In this manner, the surface grooves are removed yet the record remains self supporting.

The present invention relates to improvements in methods and apparatus of these types, taking into account the problems encountered because of different ambient temperatures and because of the presence of dust or other foreign matter on the surfaces of the records to be restored.

Whereas it is possible to design a roll whose temperature will remain constant or substantially so where the rate of introduction of records into contact with the roll is likewise constant and the ambient temperature constant as well, it has been found that where one or more of these conditions is variable, it is very difficult to assure perfect results.

When there is dust or foreign matter of other types on the surface of the record which is brought into contact with the heated roll, the presence of such material interferes with the restoration of the surface to the degree that is desirable and readily attainable where the surface is clean. This difficulty is a substantial one since the dust or other foreign matter usually becomes lodged down in the grooves. While a cleansing operation could be performed as a separate procedure entirely apart from the actual resurfacing, it has been found that the use of a liquid suitably heated above the ambient temperature contributes to both the cleaning of the surfaces to be restored and to the establishment of a reference temperature which can be maintained substantially constant.

With these objectives in view, the method of restoring a surface of an embossed thin flexible thermoplastic sound record in accordance with this invention comprises preheating the record to a predetermined elevated temperature less than the plasticizing temperature of the record material and subsequently subjecting an embossed surface of the record to a plasticizing temperature for a time sufficient to plasticize to a limited depth greater than that of the grooves but necessarily less than the record thickness. Whereas immersion of the record in a heated liquid bath to achieve the elevated reference temperature is preferred, the preheating might be otherwise achieved. Such a heated bath may contain a detergent composition and the record can be advantageously flexed and scrubbed while immersed therein to effect a simultaneous cleaning and heating. The record will then be removed from the bath and dried before having its surface elevated to the plasticizing temperature. The scrubbing is preferably performed by brushing the record in a direction opposed to that in which it is advancing.

The bath is maintained at a substantially constant elevated temperature, and maintained at a substantially constant volume so that despite the speed at which the records are fed into the apparatus, the temperature differential between the bath and the plasticizing roll will remain substantially constant.

The apparatus contemplated comprises a frame, a liquid tank supported by the frame, means for heating liquid in the tank, liquid temperature responsive means controlling the heating means, a record surface heater roll supported by the frame beyond the tank for plasticizing a record to a limited depth less than its thickness, temperature responsive means controlling the temperature of the heater roll, feed rolls carried by the frame for advancing a record through the tank to the heater roll, and driving means connected with the rolls. A record scrubbing roll supported by the frame for rotation in the tank is contemplated and more specifically it is intended that rotary brushing rolls supported by the frame for engaging opposite surfaces of a record in the tank be provided. It is also preferred that a record drying roll supported by the frame beyond the tank be employed and in the preferred embodiment, there are a plurality of pairs of record drying rolls supported by the frame beyond the tank.

The heating means for the heater roll is preferably controlled by length sensing means for the heater roll, expansion of the heater roll beyond a preselected value causing a switch to open in the circuit of an electrical heating element, thereby reducing the temperature of the roll to such a degree that its resultant contraction will again close the switch. The sensing means for actuating the switch includes a lever containing a flexible joint interposed between the roll and switch to avoid damage to any of the parts.

A more complete understanding of the invention will follow from a detailed description of the accompanying drawings wherein.

Figure 1:
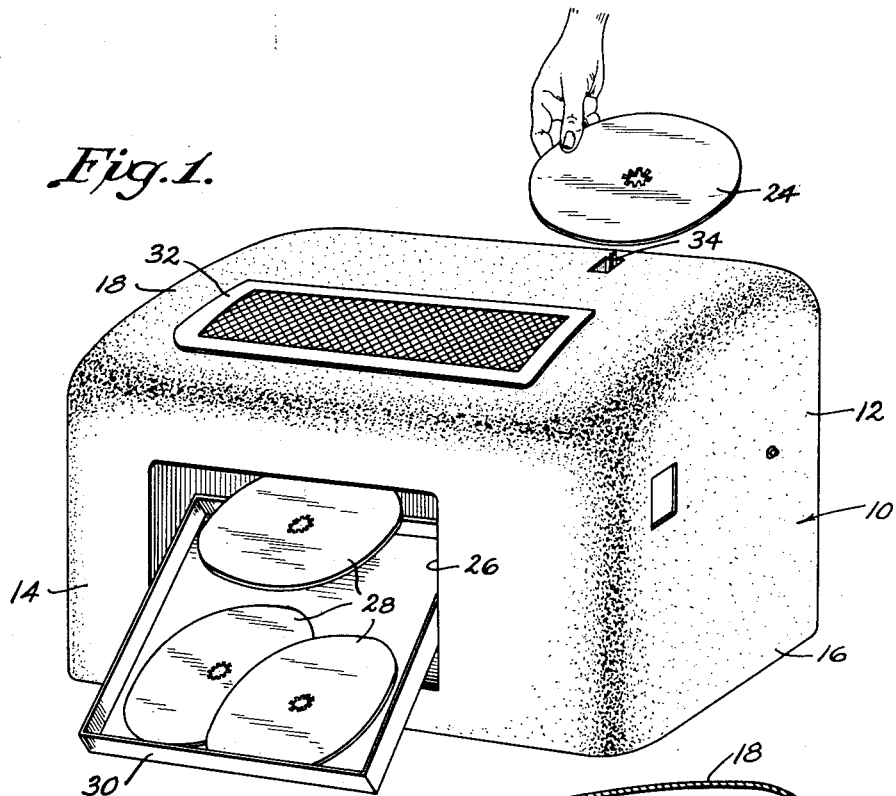
Fig. 1 is a perspective view of a form of the apparatus depicting the manner in which records are introduced and discharged.

The apparatus depicted generally by reference character 10 is provided with a cover 12 having a front wall 14, end walls 16, a top wall 18 and a rear wall 20. The rear wall is provided with a slot 22 into which a record 24 is introduced when it is desired to restore its surface. The front wall 14 contains an opening 26 through which the resurfaced records 28 are discharged into a carton 30 which is suitably supported partially within the opening. The top wall 18 contains a screened access door 32 through which certain adjustments can be made and a switch lever 34 projects through the top wall for manipulation by an operator.

Figure 2:
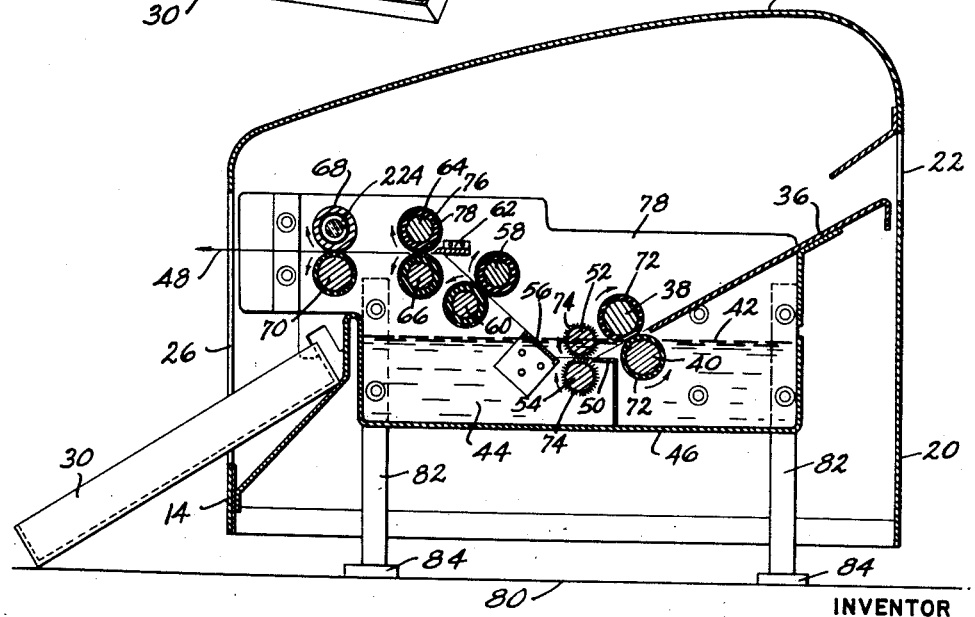
Fig. 2 is a sectional elevation of the apparatus taken along line 2—2 of Fig. 3.

When a record to have its surface restored is introduced through the slot 22, it will slide down a ramp 36, as shown in Fig. 2 into the bight between a pair of rubber surfaced feed rolls 38 and 40 below the level 42 of a body of liquid 44 provided in a tank 46. As the record emerges from between the feed rolls 38 and 40, following a path generally indicated by an arrow 48, it encounters the upper surface of a table 50, deflecting it towards the horizontal into a bight defined by a pair of brushing rolls 52 and 54 which rotate in opposition to the direction of movement of the record, whereupon the record leading edge will encounter an inclined guide 56 deflecting the record upwardly, out of the bath into a bight defined by a pair of wiping rolls 58 and 60 from which the record is directed against the lower surface of a guide 62 into a bight defined by a second pair of wiping rolls 64 and 66, from which the record passes into a bight defined by a heater roll 68 and a pressure roll 70 from which the record is discharged through the opening 26 into the carton 30.

Figure 3:
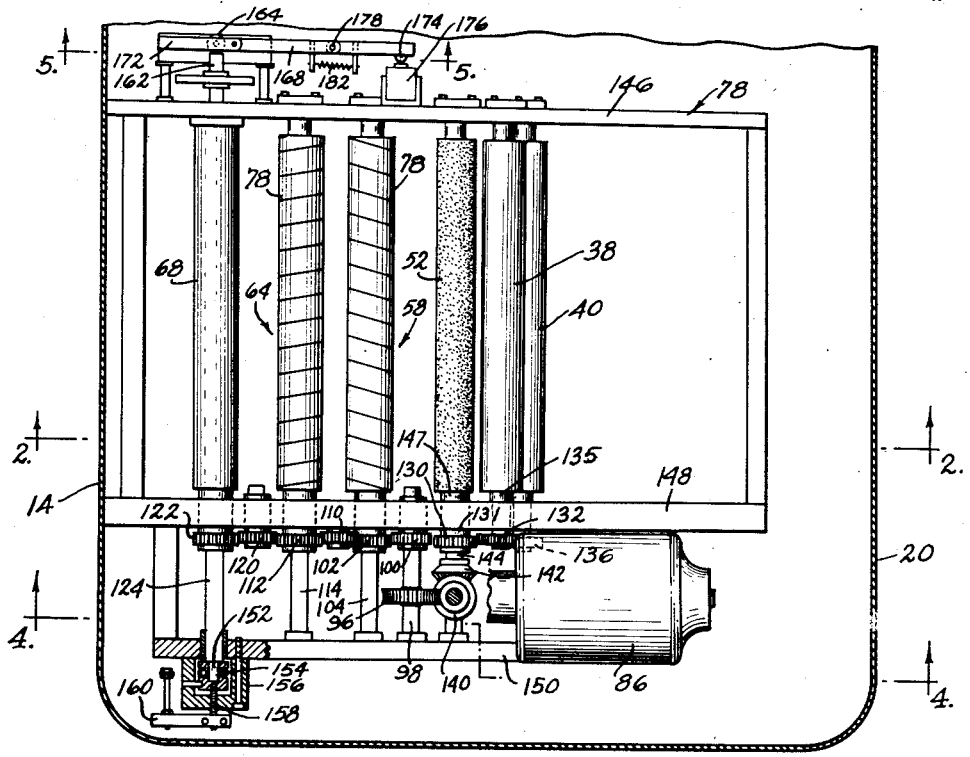
Fig. 3 is a fragmentary plan view of the apparatus with the cover partially broken away and certain other parts removed or broken away for purposes of clarification.

The feed rolls 38 and 40 may be provided with rubber covers 72 and the brushing rolls 52 and 54 with suitable bristles 74. The wiping or drying rolls 58, 60, 64 and 66 are shown as having rubber sleeves 76 interposed between the central cores and outer chamois coverings 78. These chamois coverings, as depicted in Fig. 3 are produced by helically winding strips in opposite directions upon the successive pairs of rolls to assure complete wiping and removal of liquid before the record engages the heater roll 68.

Whereas various cleaning and heat transferring liquids 44 are contemplated, highly satisfactory results have been produced by the use of water containing various proportions of synthetic detergents. It will be noted that the combined effects of flexing the submerged records by changing their direction of travel, and brushing the surfaces, will be very effective in removing foreign materials.

The frame 79 for supporting the various rolls and tank is in turn supported with respect to a horizontal surface 80 by vertical posts 82 having feet 84. A motor 86 suitably supported by the frame and provided with reduction gearing 88, has an output shaft 90 coupled with a driving shaft 92 carrying a worm 94 which drives a pinion 96 carried by a shaft 98. Also secured to the shaft 98 is a spur gear 100 which drives a spur gear 102 secured to the shaft 104 of the wiping roll 58, the spur gear 102 also meshing with a spur gear 106 secured to the shaft 108 of the wiping roll 60. The spur 102 also drives an idler gear 110 which meshes with a spur gear 112 secured to the shaft 114 of the wiping roll 64, the spur gear 112 meshing with a spur gear 116 secured to the shaft 118 of the wiping roll 66. In addition, the spur 112 meshes with an idler gear 120 which in turn meshes with a spur gear 122 secured to the shaft 124 of the heater roll 168, the spur gear 122 also meshing with a spur gear 126 secured to a shaft 128 of the pressure roll 70.

Figure 4:
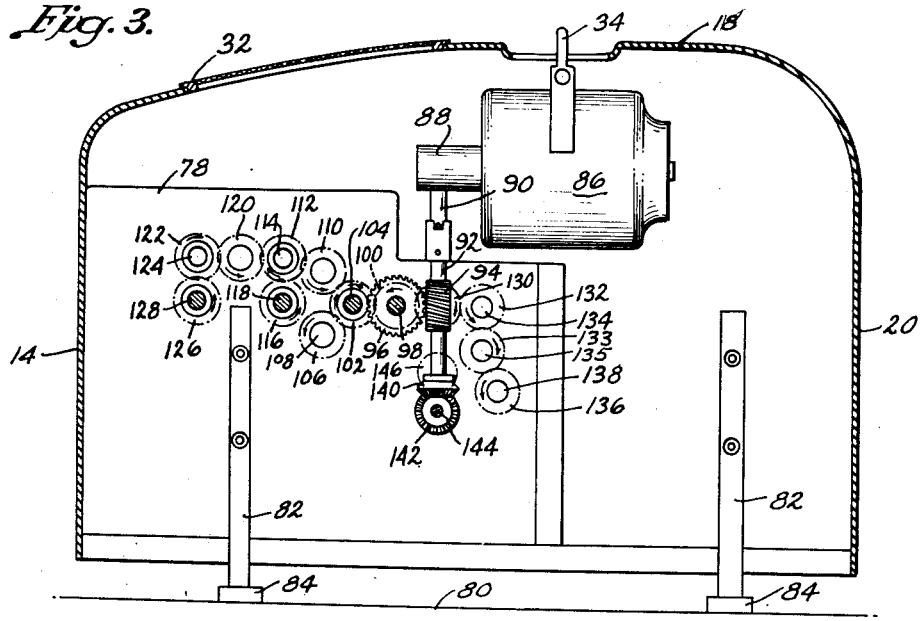
Fig. 4 is a staggered sectional elevation taken along line 4—4 of Fig. 2.

The right side of the spur gear 100 as viewed in Fig. 4, meshes with an idler gear 130 carried by a shaft 131, the gear 130 in turn meshing with an idler gear 132 mounted on a shaft 134. The gear 132 also meshes with a spur gear 133 secured to a shaft 135 carrying the upper feed roll 38, the gear 133 also meshing with a spur gear 136 secured to a shaft 138 of the lower feed roll 40.

On the lower end of the driving shaft 92, a bevel gear 140 is fastened, meshing with a bevel gear 142 secured to a shaft 144 which carries the lower brushing roll 54. A spur gear, not shown, is also secured to the shaft 144 behind the bevel gear 142, as viewed in Fig. 4, meshing with a spur gear 146 secured to a shaft 147 carrying the upper brushing roll 52.

When the motor 86 is started, all of the rolls will be driven in synchronism, and with the exception of the brushing rolls, they serve to advance the record forwardly through the cleansing, wiping and resurfacing operations. The brushing rolls are driven in directions of movement opposed to that in which the record advances in order to produce a high relative speed. The manner in which the submerged records are thus simultaneously flexed and brushed effectively cleans their surfaces.

Figure 5:
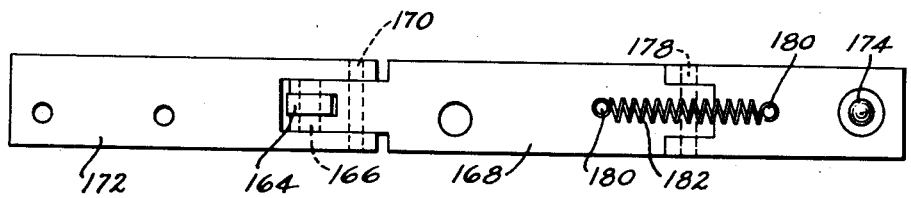
Fig. 5 is an elevation taken along line 5—5 of Fig. 3.

Except for the heater roll 68, it will suffice to say that the various rolls are suitably supported in bearings carried by frame plates 146, 148 and 150. In the case of the heater roll however, one end of its shaft 124 projects through the spaced frame plates 148 and 150, terminating in a reduced end 152 carrying a thrust bearing 154 of the anti-friction type within a housing 156, the position of the thrust bearing being adjustable relative to its housing by means of a screw 158 threadedly carried by the housing 156 and extending externally thereof to receive an adjusting crank 160. The opposite end of the heater roll 68 is carried by a shaft 162 which partakes of such axial movement as is produced by expansion and contraction of the roll, and which is supported for such movement in suitable bearings carried by the frame plate 146. The end of the shaft 162 engages a small roller 164, as shown in Fig. 5, rotatable about a pin 166 carried by the reduced end of a lever 168 pivotally articulated by means of a pin 170 to a bracket 172 secured to the frame 78. The opposite end of the lever 168 carries a projection 174 for actuation of a snap switch such as a micro-switch 176 in response to axial movements of the heater roll due to expansion and contraction. Comparing the arms of the lever 168, it will be evident that a large magnification of the heater roll movement is produced, rendering the heater control very sensitive and thereby assuring the temperature regulation required. To prevent damage to the switch, lever or heater roll, a yieldable knee joint is interposed in the longer arm of the lever 168, assuming the form of a hinge having a pintle 178. On either side of the pintle there is provided a post 180 spanned by a coiled tension spring 182 biasing the leaves thus formed to the limiting position depicted in Fig. 3 where the arm of the lever 168 adjacent the switch 176 assumes a substantially plane form. Since any additional force imparted to the lever 168 after the switch 176 has been actuated would produce no useful results, the spring 182 is calibrated so that it will yield after the switch 176 has been opened.

Figure 6:
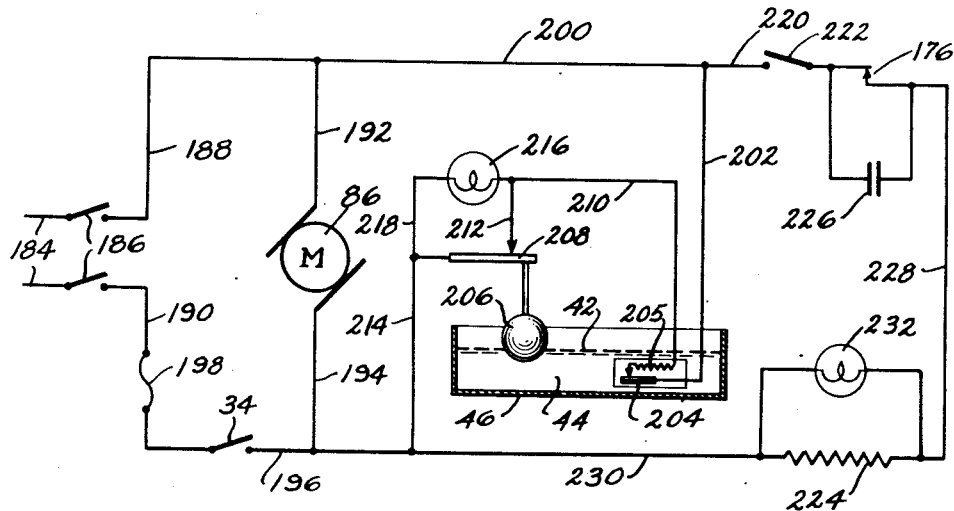
Fig. 6 is a simplified circuit diagram depicting the principal controls.

A suitable circuit for controlling the apparatus and method is depicted in Fig. 6 where a supply line 184 is connected by means of a switch 186 with conductors 188 and 190. Tracing the circuit for the motor 86, current will be conducted by the lead 188, a lead 192, the motor 86, a lead 194, a lead 196, the switch 34, a fuse 198 and the lead 190.

The lead 188 also connects with a lead 200 joined with a lead 202 connected with a thermostat 204 responsive to the temperature of the liquid 44 contained in the tank 46, the thermostat having a series connection with a water heating resistance 205 carried in the tank below the liquid level 42. When the liquid level is sufficient, as sensed by a float 206, a liquid level switch 208 will be closed whereby current passing through the liquid heating resistance 205 and its lead 210, will follow the branch 212, through the switch 208 and lead 214, back to line through the lead 196. In the event the water level drops to an extent that the float 206 opens the switch 208, then the path from the liquid heating resistance 206 will be through the lead 210, lamp 216, lead 218 and lead 214 back to line. Under these conditions, the lamp 216 will be illuminated indicating to an operator that additional liquid should be introduced into the tank 44. As will be evident to those skilled in the art, the lamp may be combined with or replaced by an automatic control for maintenance of the liquid level. In the event that the liquid temperature exceeds that for which the thermostat 204 is designed, it will break the circuit through the heater 205 until the temperature returns to the predetermined value. If on the other hand, during a starting period, the liquid had not achieved the desired temperature, the thermostat will maintain the circuit closed until such time as the temperature conditions prescribed have been attained.

The lead 200 also communicates with a lead 220 containing a switch 222 for independent control of the heater 224 arranged within the roll 68. By manual manipulation of the switch 222, an operator can activate or inactivate the heater circuit. Once this switch is closed, then the control becomes automatic in response to expansion and contraction of the heater roll as already described, and its effect upon the micro-switch 176. As depicted in the circuit diagram, the terminals of the micro-switch are bridged by a capacitor 226 to reduce arcing. Assuming the micro-switch 176 is closed, current will pass through a lead 228 and a suitable slip ring, not shown, to the roll heater 224 and then through another slip ring, not shown, through a lead 230 and lead 196 back to line. The roll heater 224 is bridged by an indicator lamp 232, illumination of which indicates that current is passing through the heater.

The gearing is designed to produce speeds of the rolls 64 and 66 identical with those of the heater roll 68 and pressure roll 70 so that there will be no tendency either to buckle or stretch the records undergoing treatment. Record material of disk, strip or other form is advanced from the drying rolls 64 and 66 rather precisely into the bight defined by the heater and pressure rolls so that the leading edge of the record will engage the heated surface for the same length of time as do the trailing portions thereof.

Having outlined the operation of the apparatus and the steps involved by the method as the description proceeded, it will be clear to those skilled in the art how the objects of this invention have been achieved. It will also be clear to those skilled in the art, just as it has been recognized already by the present inventor, that the invention can be embodied otherwise than in the forms specifically shown and described. Accordingly, the invention should not be restricted by the description and drawings beyond the scope of the appended claims.

I claim:

1. A method of restoring a surface of an embossed thin flexible thermoplastic sound record comprising immersing said record in a bath having an elevated temperature below the record plasticizing temperature and subsequently while retaining an elevated temperature subjecting an embossed surface of said record to a plasticizing temperature for a time sufficient to plasticize said record to a limited depth less than the record thickness.

2. A method of restoring a surface of an embossed thin flexible thermoplastic sound record comprising heating said record to an elevated temperature below the record plasticizing temperature and subsequently while retaining an elevated temperature subjecting an embossed surface of said record to a plasticizing temperature for a time sufficient to plasticize said record to a limited depth less than the record thickness.

3. A method of restoring a surface of an embossed thin flexible thermoplastic sound record comprising immersing said record in a detergent containing bath having an elevated temperature below the record plasticizing temperature and subsequently while retaining an elevated temperature subjecting an embossed surface of said record to a plasticizing temperature for a time sufficient to plasticize said record to a limited depth less than the record thickness.

4. A method of restoring a surface of an embossed thin flexible thermoplastic sound record comprising immersing said record in a bath having an elevated temperature below the record plasticizing temperature, scrubbing said record while immersed, and subsequently while retaining an elevated temperature subjecting an embossed surface of said record to a plasticizing temperature for a time sufficient to plasticize said record to a limited depth less than the record thickness.

5. A method of restoring a surface of an embossed thin flexible thermoplastic sound record comprising immersing said record in a bath having an elevated temperature below the record plasticizing temperature, removing said record from said bath, drying said record, and subsequently while retaining an elevated temperature subjecting an embossed surface of said record to a plasticizing temperature for a time sufficient to plasticize said record to a limited depth less than the record thickness.

6. A method of restoring a surface of an embossed thin flexible thermoplastic sound record comprising simultaneously cleaning and heating said record to an elevated temperature below the record plasticizing temperature and subsequently while retaining an elevated temperature subjecting an embossed surface of said record to a plasticizing temperature for a time sufficient to plasticize said record to a limited depth less than the record thickness.

7. A method of restoring a surface of an embossed thin flexible thermoplastic sound record comprising immersing and flexing said record in a bath having an elevated temperature below the record plasticizing temperature and subsequently while retaining an elevated temperature subjecting an embossed surface of said record to a plasticizing temperature for a time sufficient to plasticize said record to a limited depth less than the record thickness.

8. Apparatus for resurfacing a grooved flexible thermoplastic sound record comprising a frame, a liquid tank supported by said frame, means for heating liquid in said tank, liquid temperature responsive means controlling said heating means, a record surface heater roll supported by said frame beyond said tank for plasticizing a record to a limited depth less than its thickness, temperature responsive means controlling the temperature of said heater roll, feed rolls carried by said frame for advancing a record through said tank to said heater roll, and driving means connected with said rolls.

9. Apparatus for resurfacing a grooved flexible thermoplastic sound record comprising a frame, a liquid tank supported by said frame, means for heating liquid in said tank, liquid temperature responsive means controlling said heating means, a record scrubbing roll supported by said frame for rotation in said tank, a record surface heater roll supported by said frame beyond said tank for plasticizing a record to a limited depth less than its thickness, temperature responsive means controlling the temperature of said heater roll, feed rolls carried by said frame for advancing a record through said tank to said heater roll, and driving means connected with said rolls.

10. Apparatus for resurfacing a grooved flexible thermoplastic sound record comprising a frame, a liquid tank supported by said frame, means for heating liquid in said tank, liquid temperature responsive means controlling said heating means, rotary brushing rolls supported by said frame for engaging opposite surfaces of a record in said tank, a record surface heater roll supported by said frame beyond said tank for plasticizing a record to a limited depth less than its thickness, temperature responsive means controlling the temperature of said heater roll, feed rolls carried by said frame for advancing a record through said tank to said heater roll, and driving means connected with said rolls.

11. Apparatus for resurfacing a grooved flexible thermoplastic sound record comprising a frame, a liquid tank supported by said frame, means for heating liquid in said tank, liquid temperature responsive means controlling said heating means, a record drying roll supported by said frame beyond said tank, a record surface heater roll supported by said frame beyond said tank for plasticizing a record to a limited depth less than its thickness, temperature responsive means controlling the temperature of said heater roll, feed rolls carried by said frame for advancing a record through said tank to said heater roll, and driving means connected with said rolls.

12. Apparatus for resurfacing a grooved flexible thermoplastic sound record comprising a frame, a liquid tank supported by said frame, means for heating liquid in said tank, liquid temperature responsive means controlling said heating means, a plurality of pairs of record drying rolls supported by said frame beyond said tank, a record surface heater roll supported by said frame beyond said tank for plasticizing a record to a limited depth less than its thickness, temperature responsive means controlling the temperature of said heater roll, feed rolls carried by said frame for advancing a record through said tank to said heater roll, and driving means connected with said rolls.

13. Apparatus for resurfacing a grooved flexible thermoplastic sound record comprising a frame, a liquid tank supported by said frame, means for heating liquid in said tank, liquid temperature responsive means controlling said heating means, record scrubbing and drying rolls supported by said frame, a record surface heater roll supported by said frame beyond said tank for plasticizing a record to a limited depth less than its thickness, temperature responsive means controlling the temperature of said heater roll, feed rolls carried by said frame for advancing a record through said tank, and into engagement with said scrubbing, drying and heater rolls, and driving means connected with said rolls.

CHARLES W. HELM, Jr.

References Cited in the file of this patent

UNITED STATES PATENTS

| Number | Name | Date |
|---|---|---|
| 1,612,270 | Duffie | Dec. 28, 1926 |
| 2,265,032 | Feyrer | Dec. 2, 1941 |
| 2,340,161 | Van Deventer | Jan. 25, 1944 |
| 2,355,746 | Nordberg | Aug. 15, 1944 |
| 2,366,825 | Adams | Jan. 9, 1945 |
| 2,431,473 | Flynn | Nov. 25, 1947 |
| 2,551,005 | Johnson | May 1, 1951 |
| 2,611,927 | Roberts et al. | Sept. 30, 1952 |